Aug. 21, 1951  G. W. BARTLETT  2,565,342
DRAG FOR BODIES AND THE LIKE
Filed March 21, 1950
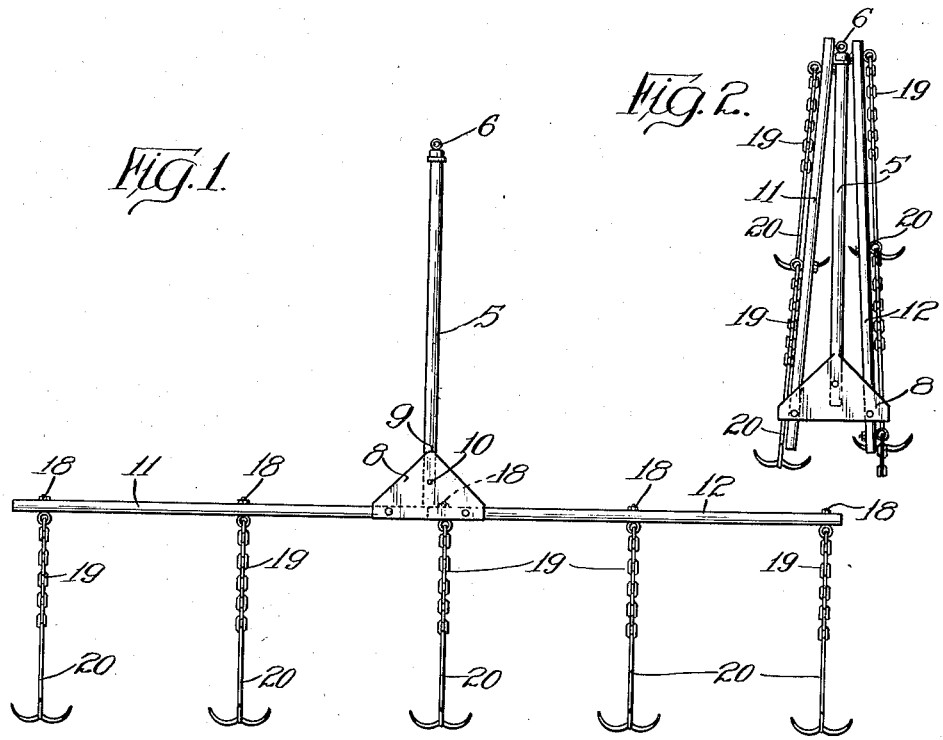
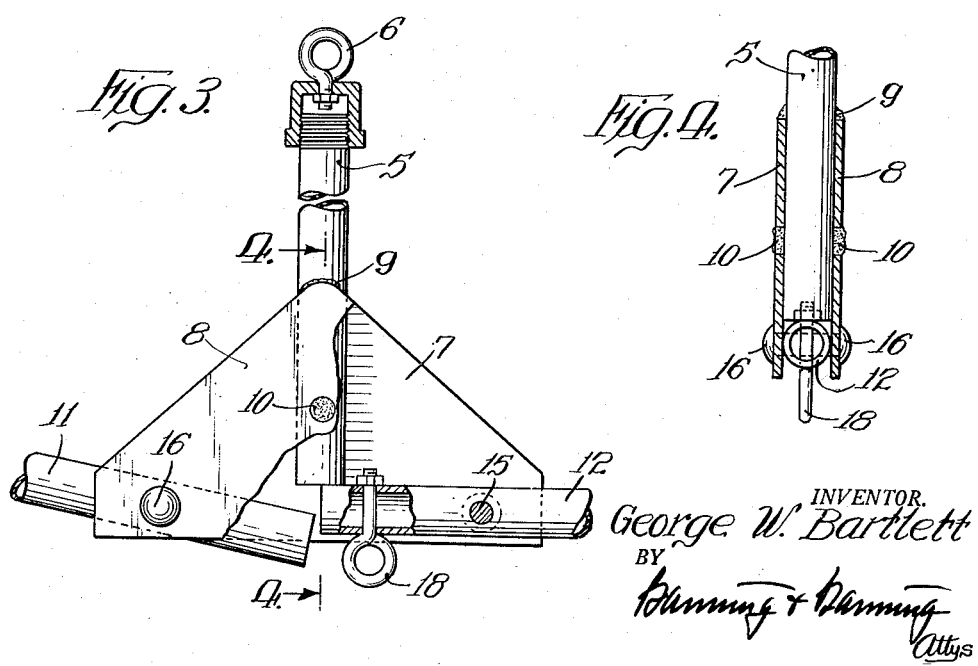
INVENTOR.
George W. Bartlett
BY
Banning & Banning
Attys Patented Aug. 21, 1951

2,565,342

UNITED STATES PATENT OFFICE 2,565,342

DRAG FOR BODIES AND THE LIKE

George W. Bartlett, Antioch, Ill.

Application March 21, 1950, Serial No. 150,977

4 Claims. (Cl. 294—66)

This invention relates to certain improvements in a drag for bodies and the like which lie submerged at the bottom of a lake or stream.

Devices of this kind are used infrequently, and so usually remain stored away until an emergency arises when their immediate production is called for. The place to which such a device must be taken for use is often miles away. It is for reasons such as these that the importance of having the drag light and compact become readily apparent. Particularly is this true since, in operation, the drag must be set up and be placed in use with a minimum of time, and this should not be prolonged by any preliminaries which can possibly be dispensed with.

Bearing in mind these considerations, I have developed a drag which may readily be stored away in a small space or kit where it may be kept most of the time. When needed, however, the device, while still in a folded condition, may be seized and taken to the spot where needed. At the place of use, the device is then unfolded, without any preliminaries whatsoever, and when done the device is fully ready for use.

A drag meeting these special requirements embodies the several features of advantage which characterize this invention. It is also light, inexpensive to build, and amply strong for its intended purposes. The exemplification of my invention herein illustrated shows:

In Figure 1, a plan view of the drag opened up ready for use;

In Fig. 2, a similar view of the drag folded up ready for storage or transport;

In Fig. 3, a fragmentary detail, partly in section, showing the draft link and lateral bars, together with the common mounting therefor; and In Fig. 4, a detail in section, taken on line 4—4 of Fig. 3.

The present drag makes use of a tubular draft link 5 to the forward end of which is applied an eye fitting 6 for connection with a tow rope or the like. The after end of the draft link is fitted between two like plates 7 and 8 disposed in parallelism and each of generally triangular form. As by welding 9 the draft link is secured fixedly to the two plates 7 and 8 at the forward apex thereof and again at a more rearward point 10.

The two plates 7 and 8 constitute a mounting for a pair of laterally extending tubular bars 11 and 12. These bars are alike in that each is provided with a transverse opening to receive a pivot pin (or bolt) 15 which extends also through the plates 7 and 8, with means 16 at opposite ends engaging the outer plate faces to immobilize the pin axially. The pivotal connections thus provided for the bars 11 and 12 are at points on opposite sides of the draft link, equidistant therefrom, and spaced from each other about twice the distance which obtains between the transverse openings through each bar and the proximate end thereof.

Furthermore, the two pivot pins 15 are so located rearwardly that the bars 11 and 12, when opened outwardly to operative position, will engage the after end of the draft link at a point where the bars are substantially in alignment. This is important because the draft link thereby provides a stop for the outwardly swinging movements of the bars at a predetermined point where they remain effectively positioned for dragging operations. In the folding and unfolding movements of the bars, the plates 7 and 8 constitute guides whereby to assure that such movements will be confined to a single plane.

Each bar 11 and 12 carries at spaced points a plurality of fittings such as eye bolts 18 to which are attached short chains 19 each in connection with the shank of a grapple hook 20. In response to pull upon the draft link 5, the bars 11 or 12 will advance laterally over the lake or river bed that is to be dragged, and in so doing will drag behind them the several grapple hooks which trail rearwardly more or less in parallelism as indicated in Fig. 1. This operation of pulling the drag back and forth over the ground to be covered may be continued with the bars 11 and 12 always extended outwardly to trail the grapple hooks rearwardly thereof. The bars are held against swinging rearwardly beyond their transverse positions with respect to the draft link by reason of their engagement with the rear end thereof.

At the conclusion of work, when the drag is removed from the water, the bars are free to be swung inwardly alongside of the draft link 5 into substantial parallelism therewith, as shown in Fig. 2. The total length of the device when so folded up is approximately half of that which obtains when it is opened out and in operation. It is, therefore, very convenient to handle, transport, and store away until another occasion for its use arises.

The mounting plates to which the draft link and bars are connected provide therefor a connection which is simple, light, and sturdy. This is important because, in use, the drag may encounter considerable resistance and so must be able to withstand any and all such conditions. By using two such mounting plates, separated but parallel, to provide therebetween a space for accommodation of the proximate ends of the draft link and of the folding bars, I provide a balanced arrangement by which the strains are equalized. In this way it is possible to hold to a minimum the weight and strength of the materials employed for these several parts which together constitute the drag structure.

In the folded up condition, as shown in Fig. 2, the drag may be readily stored along with other first aid and rescue equipment in a kit or other case so as to occupy but a minimum of space when placed in a vehicle for transport to a point of use. One advantage inherent in the present construction is that there need be no preliminaries to unfolding of the bars to operative position, so that use of the drag may be started with a minimum of delay. At the conclusion of operations the bars may again be folded up so as to render the structure compact for storage or transport purposes, and there need be no removal or replacement of parts in so doing.

I claim:

1. A drag of the character described comprising a draft link, a mounting permanently and rigidly affixed to the after end of the draft link and extended symmetrically laterally thereof, a pair of grapple-hook carrying bars in mutual alignment extended symmetrically laterally of the mounting with one end portion of each bar proximate to the other and in engagement with the after end of the draft link, and means equidistant from the draft link pivotally connecting each bar to the mounting at a point which permits swinging movement of the bars from positions alongside the draft link to positions transversely thereof where their swinging movements are stopped by engagement with the after end of the draft link, as aforesaid.

2. A drag of the character described comprising a draft link, a mounting permanently and rigidly affixed to the after end portion of the draft link and extended symmetrically laterally thereof, the mounting comprising a pair of like plates spaced apart in parallelism, along opposite sides of the draft link, a pair of pivot pins extended transversely through the two mounting plates and the space therebetween at points rearwardly of the draft link and laterally equidistantly therefrom, and a pair of grapple-hook carrying bars having lengths similar to each other and to the draft link and each provided near one end with a transverse opening therethrough for receiving one pivot pin, the bars being accommodated closely within the space between the two plates to be guided thereby in swinging movements about the pivot pins from folded positions alongside the draft link to unfolded positions transversely thereof and substantially in line with each other, the end portion of each bar proximate to the draft link, when the bars are in unfolded positions, being engageable with the after end of the draft link whereby to limit the unfolding movements of the bars to positions where they are substantially transversely thereof and in alignment with each other.

3. A drag of the character described comprising a pair of like plates in spaced relation to provide a mounting therebetween, a draft link having its after end portion entered between the mounting plates and secured fixedly and permanently thereto, and a pair of grapple-hook carrying bars each having one end portion entered between the mounting plates and pivotally connected thereto at a point to permit swinging movement of the bars from a folded position alongside of the draft link to an unfolded position transversely thereof with the bar end portions proximate to the link in engagement therewith to be stopped thereby.

4. A drag of the character described comprising a draft link, a pair of like plates rigidly and permanently secured in parallelism to opposite sides of the after end portion of the draft link, the two plates extending laterally and rearwardly of the proximate end of the draft link, there being formed in the two plates two pairs of registering holes equidistant from the draft link and rearwardly thereof, a pair of grapple-hook carrying bars each having a transverse opening therethrough at a point removed from one end thereof by a distance approximately one-half that which separates the two pairs of registering holes in the two plates, and means extending through each pair of holes and through the transverse opening of one bar to establish therebetween a pivotal connection about which the bar is free to swing between a folded position alongside the draft link and an unfolded position substantially transversely thereof, the extreme end portion of each bar, when in fully unfolded position, being engaged with the after end of the draft link whereby to limit its unfolding movement at that point.

GEORGE W. BARTLETT.

REFERENCES CITED

The following references are of record in the file of this patent:

UNITED STATES PATENTS

| Number | Name | Date |
| --- | --- | --- |
| 2,277,545 | Gatley | Mar. 24, 1942 |